United States Patent
Uhlig et al.

(10) Patent No.: US 7,849,979 B2
(45) Date of Patent: Dec. 14, 2010

(54) BRAKE DRUM

(75) Inventors: Robert P. Uhlig, Rochester Hills, MI (US); Danet Suryatama, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 103 days.

(21) Appl. No.: 11/424,400

(22) Filed: Jun. 15, 2006

(65) Prior Publication Data

US 2007/0289824 A1  Dec. 20, 2007

(51) Int. Cl.
*F16D 65/12* (2006.01)
*F16D 65/14* (2006.01)

(52) U.S. Cl. ................................. 188/218 R; 188/73.1

(58) Field of Classification Search ............. 188/218 R, 188/73.1, 73.31, 75, 78, 206 R, 73.2
See application file for complete search history.

(56) References Cited

U.S. PATENT DOCUMENTS

| | | | | | |
|---|---|---|---|---|---|
| 1,766,216 | A * | 6/1930 | Booth | ..................... | 188/218 R |
| 1,881,002 | A * | 10/1932 | Udale | ..................... | 188/264 R |
| 1,982,900 | A * | 12/1934 | Buckwalter | ............. | 188/218 R |
| 2,016,871 | A * | 10/1935 | Nelson | .................... | 188/218 R |
| 2,414,156 | A * | 1/1947 | Malthaner | ............... | 188/264 R |
| 2,897,925 | A * | 8/1959 | Strohm | .................... | 188/218 R |
| 3,487,894 | A * | 1/1970 | Szigeti | ..................... | 188/70 R |
| 4,955,458 | A * | 9/1990 | Shellhause | ................... | 188/2 D |
| 6,376,766 | B1 * | 4/2002 | Bartholoma et al. | ........ | 174/354 |
| 7,216,746 | B2 * | 5/2007 | Yamamoto et al. | ...... | 188/218 R |
| 2006/0222280 | A1 * | 10/2006 | Harada et al. | ............... | 384/561 |

FOREIGN PATENT DOCUMENTS

DE  3411049 A1 * 10/1984
WO  WO 99/32798  7/1999

* cited by examiner

*Primary Examiner*—Melody M Burch
(74) *Attorney, Agent, or Firm*—Ralph E. Smith

(57) ABSTRACT

A brake drum includes a generally cylindrical sidewall that is open at one end and at least partially closed by an endwall at its other end. The sidewall preferably has a thickness that vanes along its axial length and preferably is thickest at the end closest to the endwall. In one implementation, the outer surface of the sidewall is generally frustum shaped in cross section with a straight radially tapered outer wall. In another implementation, the outer surface of the sidewall is generally concave or sloped from the first end to a second end spaced from the endwall. In another implementation, the outer surface of the sidewall is generally convex.

19 Claims, 2 Drawing Sheets

BRAKE DRUM

FIELD OF THE INVENTION

This invention relates generally to vehicle braking systems and more particularly to a brake drum.

BACKGROUND OF THE INVENTION

Various braking systems are known and used for stopping vehicles of all types. Among these, disk brakes and drum brakes have been used for many years in automotive vehicles. Drum brakes may be used in certain automotive vehicles because they are relatively inexpensive and facilitate incorporation of a parking brake to the braking system. Drum brakes utilize a drum that is mounted to and rotates with a vehicle wheel, and one or more shoes that are selectively urged into engagement with the brake drum to slow the rotation of the wheel and stop the vehicle.

SUMMARY OF THE INVENTION

A brake drum includes a generally cylindrical sidewall that is open at a first axial end and at least partially closed by an endwall at its second axial end. The sidewall preferably has a thickness that varies along its axial length and preferably is thickest at the second end closest to the endwall. In one implementation, the sidewall is generally frustoconical in cross section with a straight radially tapered outer surface. In another implementation, the outer surface of the sidewall is generally concave or sloped from the first end of the sidewall to the second end of the sidewall. In another implementation, the outer surface of the sidewall is generally convex. The first end of the sidewall furthest from the endwall preferably is relatively thick, as compared to the endwall, and may blend in and be substantially continuous with a rub track section of the sidewall.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
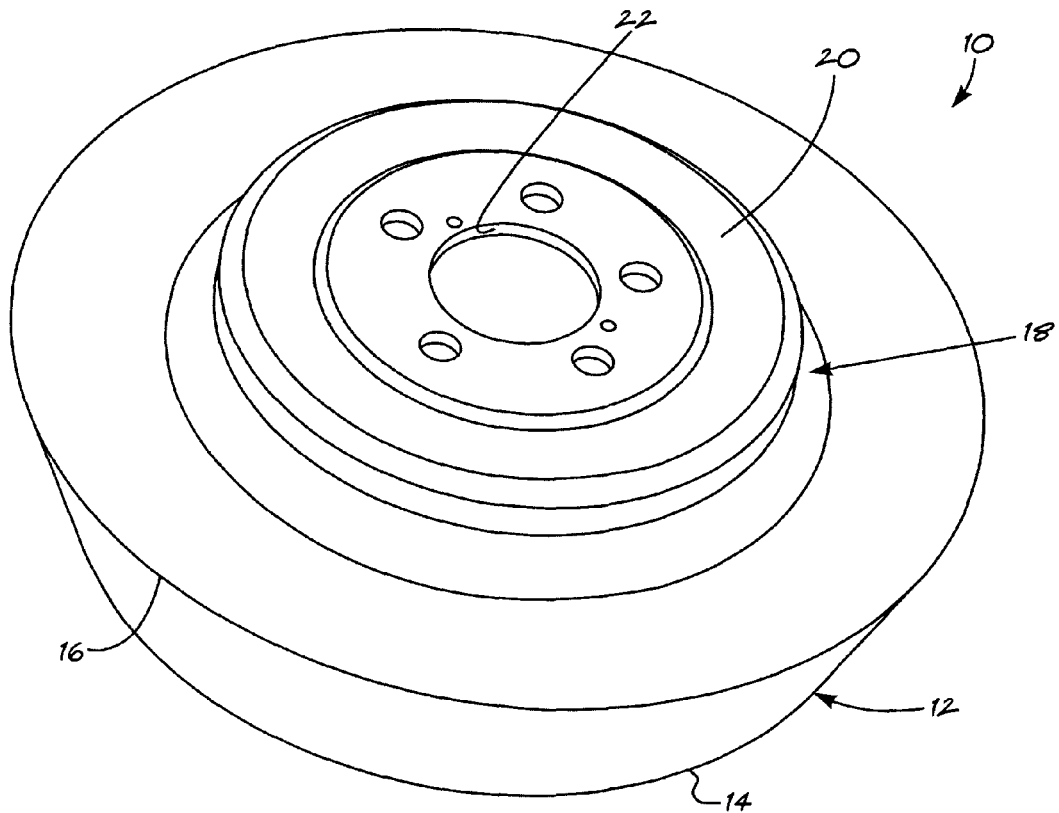
FIG. 1 is a perspective view of a brake drum.
Figure 2:
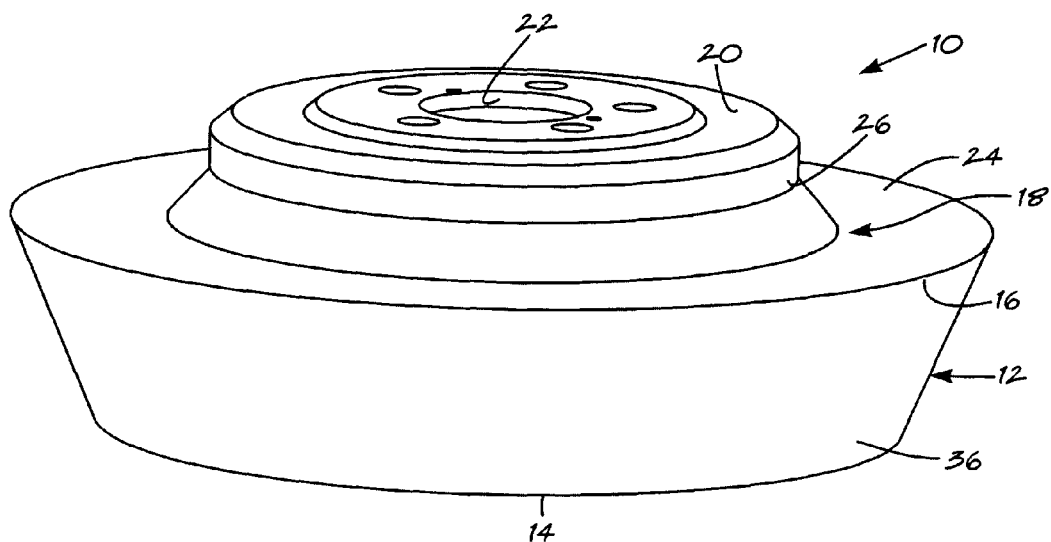
FIG. 2 is another perspective view of the brake drum of FIG. 1.
Figure 3:
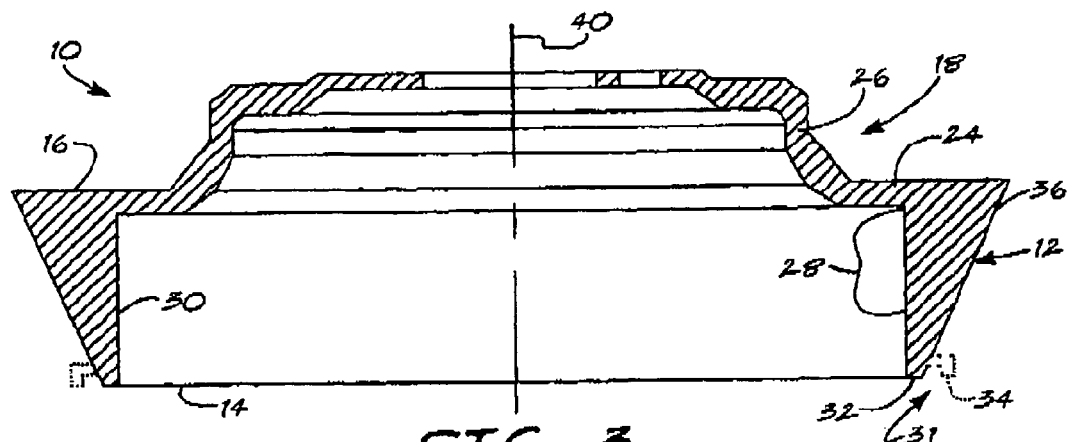
FIG. 3 is a cross sectional view of a brake drum of FIG. 1.

Referring in more detail to the drawings, FIGS. 1-3 illustrate a brake drum 10 for a vehicle brake assembly. The brake drum 10 may be used in a conventional brake system wherein a pressurized fluid drives a piston (not shown) that actuates one or more brake shoes (not shown) that engage and frictionally resist rotation of the brake drum 10 to slow the rotation and, if desired, stop the rotation of a wheel to which the brake drum is attached.

The brake drum 10 preferably includes a sidewall 12 open at a first end 14 and leading at its second end 16 to a transition portion 18, which in turn leads to a radially inwardly extending endwall 20. The endwall 20 preferably includes a central through opening 22 and may have a generally stepped or contoured profile in cross section for receipt of adjacent components of the braking system, or for other reasons. The endwall 20 may have a smaller diameter than the sidewall 12 and is interconnected to the sidewall 12 by the transition portion 18. The transition portion 18 may be generally arcuate and concave, as viewed in FIGS. 2 and 3. The transition portion 18 may include a first or radially inwardly extending portion 24 extending from the sidewall 12, and a second or generally axially extending portion 26 leading to the endwall 20.

As best shown in FIG. 3, the sidewall 12 of the brake drum 10 preferably includes an axially extending rub track 28 portion along its inner surface 30, and may include a labyrinth portion 31 adjacent to the free end 14. The labyrinth portion 31 may have an inner labyrinth 32 and an outer labyrinth 34 (shown in hidden lines only in FIG. 3 as an alternative). The sidewall 12 may have a varying thickness. As shown, the sidewall 12 may decrease in thickness from the second end 16 closest to the endwall 20 to the first end 14 which may define part of the labyrinth portion 31. The labyrinth portion 31 and rub track section 28 of the sidewall 12 may be substantially continuous providing a relatively smooth outer surface 36 of the sidewall 12 without substantial steps or other non-uniform changes in radial dimension. In this implementation, the sidewall 12 is generally frustum shaped with a generally linearly tapered outer surface 36. The inner surface 30 of the sidewall 12 preferably extends axially and is concentrically aligned with the axis of rotation 40 of the brake drum 10.

Figure 4:
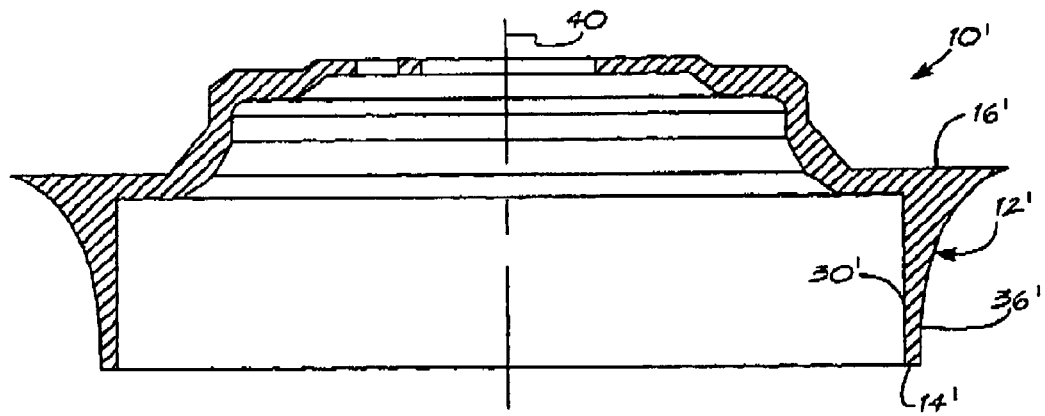
FIG. 4 is a cross sectional view of a modified brake drum.
Figure 5:
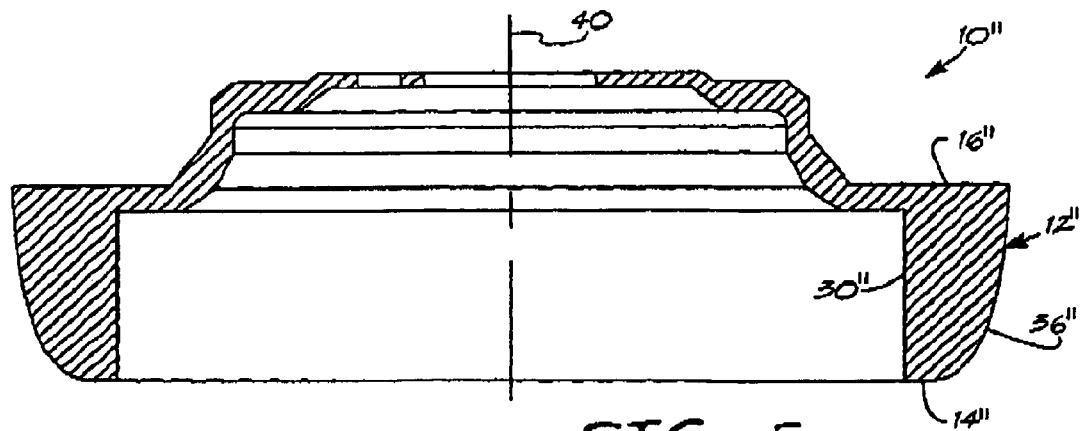
FIG. 5 is a cross sectional view of another modified brake drum.

As shown in FIG. 4, in one brake drum 10', the sidewall 12' may also be generally concave, with a contoured outer surface 36' from its thicker first end 14' to its thinner second end 16'. In another brake drum 10" shown in FIG. 5, the outer surface 36" and hence the sidewall 12" as a whole is generally convex in cross section. While shown with generally smooth and continuous transitions from the rub track section 28 to the labyrinth section 31 of the sidewall 12 in each presently preferred implementation, the change in thickness along the sidewall 12 in either the rub track 28 or labyrinth sections 31, or in the transition between them, does not have to be smooth or continuous. For example, without limitation, a portion of a sidewall 12 may be concave and another portion convex or generally linearly tapered. Still further, certain portions may not reduce in thickness along at least a part of their axial length, as desired for a particular application.

The brake drum 10 may be formed in one unitary piece such as by casting an appropriate metal. Desirably, each portion of the brake drum 10 is concentric about the axis of rotation 40 of the brake drum 10. However, at least some brake drums will be manufactured with some eccentricity. In other words, they will not be perfectly round or coaxially arranged, and they may not be perfectly centered when mounted and assembled on the wheel with which they rotate. Further, components that interact with the brake drum 10, such as the brake shoes, may not be perfectly aligned with the brake drum 10 nor evenly frictionally applied thereto.

Accordingly, the friction force and torque applied to the brake drum 10 may vary as the brake drum rotates. This leads to non-uniform forces on the brake drum and its related components, and non-uniform heat loads applied to the brake drum. This, in turn, will lead to non-uniform distortion of the brake drum 10 wherein certain regions of the brake drum 10 will distort more than others, which can further exacerbate the problem of uneven force and temperature loading on the brake drum.

The varying thickness of the sidewall 12 of the brake drum 10 may increase its stiffness in at least certain regions. The increased stiffness permits the brake drum 10 to resist distortion due to uneven friction, torque or temperature loading on the brake drum in use which can limit the time based increase in distortions due to uneven friction, torque and temperature loading. Still further, the brake drums may utilize a comparatively thick inner labyrinth section 32 which resists distortion and time based changes to the shape and temperature thereof. Accordingly, a braking system using the brake drum 10 may perform more consistently over a wide range of force and temperature loading. This may provide a more consistent braking force for a given actuation of the brake pedal, and may reduce vibrations, regenerative judder or other undesirable feedback from the braking system to the vehicle.

In at least some implementations, the thickest portion of the sidewall may be between about 1.2 to 7.5 times, and more preferably about 2 to 4 times, greater than the thickness of the thinnest portion of the sidewall. In one implementation, the second end 16 of the sidewall 12 may be about 22.5 mm thick, plus or minus 50%, and the first end 14 of the sidewall 12 may be about 9 mm thick, plus or minus 50% as practical within the given range. Further, the thickness of the sidewall 12 at its first end 14 may be thicker that the endwall 20. In one implementation, the thickness of the first end 14 of the sidewall 12 may be about 1.1 to 3.5 times greater than the thickness of the endwall. For example, the first end 14 of the sidewall 12 may be between about 4.5 mm to 14 mm thick, and the endwall 20 may be between 4 mm to 12 mm thick.

In another implementation of a brake drum having a sidewall 12' with a generally concave outer surface, the thickness of the second end 16' of the sidewall may be about 22.5 mm, the thickness of the first end 14' of the sidewall may be about 9 mm thick, and a point approximately half the distance between the first end and the second end may be about 10.5 mm thick. All of the stated thicknesses are exemplary and may vary by plus or minus 50%. In still another implementation of a brake drum having a sidewall 12" with a generally convex outer surface, the thickness of the second end 16" of the sidewall may be about 22.5 mm, the thickness of the first end 14" of the sidewall may be about 9 mm thick, and an area of the sidewall approximately 60% of the distance from the first end to the second end may be about 20 mm thick. All of the stated thicknesses are exemplary and may vary by plus or minus 50%.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims

What is claimed is:

1. A brake drum, comprising:
   (a) an annular disk-shaped endwall adapted to be connected to a vehicle wheel for rotation about an axis, the endwall including a radially outermost portion,
   (b) a sidewall extending generally parallel to the rotational axis having (1) an inner surface that extends from a first open end to a second end disposed toward the endwall with the inner surface defining a rub track section, and (2) a relatively smooth outer surface that is concave having a maximum cross sectional thickness disposed at or adjacent the second end and a minimum cross sectional thickness disposed a distance axially therefrom,
   (c) a generally arcuate and concave transition portion extending from the endwall to the second end of the sidewall interconnecting the endwall and the sidewall, the transition portion connecting to an end surface of the second end of the sidewall, the end surface of the second end of the sidewall facing toward the endwall and defining a largest diameter portion of the brake drum, the transition portion further comprising a first portion that extends radially inward from the sidewall toward a remainder of the transition portion, the first portion having an outwardly facing surface that is coplanar with and continuously connects to the end surface of the second end of the sidewall, and
   wherein the endwall, sidewall, and the transition portion define a brake drum formed in one unitary piece.

2. The brake drum of claim 1 wherein the first portion of the transition portion comprises an inner surface that juxtaposes a portion of an end of the rub track section, wherein the outwardly facing surface of the first portion faces toward the endwall, wherein the transition portion further includes an axially extending second portion connected to the endwall, and wherein the sidewall has a continuously variable thickness along its axial extent.

3. The brake drum of claim 1 wherein the entire outer surface of the sidewall is concave.

4. The brake drum of claim 1 wherein the portion of the sidewall having the maximum cross sectional thickness is between 1.2 and 7.5 times thicker than the portion of the sidewall having the minimum cross sectional thickness.

5. The brake drum of claim 1 wherein the portion of the sidewall having the maximum cross sectional thickness is between 2 to 4 times thicker than the portion of the sidewall having the minimum cross sectional thickness.

6. The brake drum of claim 1 wherein the thickness at the first open end of the sidewall has a cross sectional thickness of between 1.1 and 3.5 times the cross sectional thickness of the endwall.

7. A brake drum, comprising:
   (a) an endwall adapted to be connected to a vehicle wheel for rotation about an axis, the endwall including a radially outermost portion,
   (b) a sidewall extending generally parallel to the rotational axis having (1) an inner surface that extends from a first open end to a second end disposed toward the endwall with the inner surface defining a rub track section, and (2) a relatively smooth outer surface that is convex having a maximum cross sectional thickness disposed at or adjacent the second end and a minimum cross sectional thickness disposed a distance axially therefrom, and
   (c) a radially and axially extending arcuate and concave transition portion connecting the endwall to an end surface defined at the second end of the sidewall and defining a largest diameter portion of the brake drum, the transition portion further comprising a first portion that extends radially inward from the sidewall toward a remainder of the transition portion, the first portion having an outwardly facing surface that is coplanar with and continuously connects to the end surface of the second end of the sidewall,
   wherein the thickness of the sidewall varies along its axial extent such that the sidewall has a thickness in cross section that is greater adjacent to the transition portion than adjacent to the first open end, and
   wherein the endwall, sidewall, and the transition portion define a brake drum formed in one unitary piece.

8. The brake drum of claim 7 wherein the transition portion comprises an axially extending second portion connected to the endwall and an interconnecting portion that interconnects the first portion and the second portion and which is disposed at an angle between the first portion and the second portion, and wherein the sidewall has a continuously variable thickness along its axial extent.

9. The brake drum of claim 7 wherein the portion of the sidewall having the maximum cross sectional thickness is between 1.2 and 7.5 times thicker than the portion of the sidewall having the minimum cross sectional thickness.

10. The brake drum of claim 7 wherein the thickness at the first open end of the sidewall has a cross sectional thickness of between 1.1 and 3.5 times the cross sectional thickness of the endwall.

11. A brake drum, comprising:
(a) an annular disk-shaped endwall adapted to be connected to a vehicle wheel for rotation about an axis,
(b) a sidewall extending generally parallel to the rotational axis having (1) an inner surface that extends from a first open end to a second end disposed toward the endwall with the inner surface comprising a rub track that is generally parallel to the rotational axis, and (2) a relatively smooth outer surface that is frustum shaped and linearly tapered from a maximum cross sectional thickness in a radial direction relative to the rotational axis disposed at or adjacent the second end to a minimum cross sectional thickness in the radial direction relative to the cross sectional thickness disposed at or adjacent the first open end,
(c) a radially and axially extending generally arcuate and concave transition portion connected to the endwall and connected to an end surface defined at the second end of the sidewall and defining a largest diameter portion of the brake drum at or adjacent the region of maximum thickness of the sidewall, the transition portion further comprising a first portion that extends radially inward from the sidewall toward a remainder of the transition portion, the first portion of the transition portion having an outwardly facing surface that is coplanar with and continuously connects to the end surface of the second end of the sidewall and
wherein the endwall, sidewall, and the transition portion define a brake drum formed in one unitary piece.

12. The brake drum of claim 11 wherein the transition portion has an axially extending second portion connected to the endwall, and an interconnecting portion extending at an angle between the first portion and the second portion.

13. The brake drum of claim 11 wherein the maximum cross sectional thickness of the sidewall is between 1.2 and 7.5 times thicker than the minimum cross sectional thickness of the sidewall.

14. The brake drum of claim 13 wherein the maximum cross sectional thickness of the sidewall is between 2 to 4 times thicker than the minimum cross sectional thickness of the sidewall.

15. The brake drum of claim 11 wherein the thickness of the sidewall at the first open end of the sidewall has a cross sectional thickness of between 1.1 and 3.5 times the cross sectional thickness of the endwall.

16. The brake drum of claim 1 wherein the first portion of the transition portion has opposing surfaces facing a portion of the rub track and toward the endwall, respectively, wherein the transition portion further comprises (1) an axially extending second portion connected to the endwall, and (2) an arcuate portion that interconnects the first portion and the second portion that (i) is disposed at an angle relative to the first portion, and (ii) is disposed at an angle relative to the second portion.

17. The brake drum of claim 16 wherein the arcuate portion of the transition portion has an inner surface that is generally arcuate.

18. The brake drum of claim 1, wherein the first portion of the transition portion has an inwardly facing surface connecting to and extending orthogonally from the rub track section.

19. The brake drum of claim 1, wherein the end surface of the second end of the sidewall is annular and intersects with an outer circumferential surface of the sidewall such that the annular end surface of the second end of the sidewall and the outer circumferential surface of the sidewall define an acute angle therebetween.

* * * * *